(12) United States Patent
Hsu et al.

(10) Patent No.: US 11,365,573 B2
(45) Date of Patent: Jun. 21, 2022

(54) DOUBLE-SCREEN ROTARY SHAFT STRUCTURE

(71) Applicant: FIRST DOME CORPORATION, New Taipei (TW)

(72) Inventors: An Szu Hsu, New Taipei (TW); Yan-Jiao Cheng, Shenzhen (CN)

(73) Assignee: FOSITEK CORPORATION, New Taipei (TW)

(*) Notice: Subject to any disclaimer, the term of this patent is extended or adjusted under 35 U.S.C. 154(b) by 224 days.

(21) Appl. No.: 15/931,750

(22) Filed: May 14, 2020

(65) Prior Publication Data
US 2021/0355725 A1 Nov. 18, 2021

(51) Int. Cl.
| E05D 3/12 | (2006.01) |
| E05D 3/18 | (2006.01) |
| G06F 1/16 | (2006.01) |
| H04M 1/02 | (2006.01) |

(52) U.S. Cl.
CPC .......... *E05D 3/12* (2013.01); *E05D 3/18* (2013.01); *G06F 1/1681* (2013.01); *H04M 1/022* (2013.01); *E05Y 2900/606* (2013.01); *H04M 2250/16* (2013.01)

(58) Field of Classification Search
CPC .......... E05D 3/12; E05D 3/18; G06F 1/1681; H04M 1/022; H04M 2250/16; E05Y 2900/606
See application file for complete search history.

(56) References Cited

U.S. PATENT DOCUMENTS

| 8,904,601 | B2* | 12/2014 | Hsu | H04M 1/0216 |
| | | | | 16/366 |
| 8,959,720 | B2* | 2/2015 | Hsu | H04M 1/022 |
| | | | | 16/303 |
| 9,003,607 | B1* | 4/2015 | Hsu | G06F 1/1618 |
| | | | | 16/366 |
| 9,388,614 | B2* | 7/2016 | Hsu | E05D 3/12 |
| 9,860,999 | B1* | 1/2018 | Hsu | E05D 3/18 |
| 10,480,225 | B1* | 11/2019 | Hsu | E05D 3/12 |
| 10,520,988 | B2* | 12/2019 | Hsu | G06F 1/1681 |
| 10,590,685 | B2* | 3/2020 | Hsu | E05D 3/12 |
| 10,641,318 | B2* | 5/2020 | Siddiqui | F16C 11/04 |
| 10,659,576 | B1* | 5/2020 | Hsu | H04M 1/0268 |
| 10,824,204 | B2* | 11/2020 | Lin | G06F 1/1616 |

(Continued)

*Primary Examiner* — Jeffrey O'Brien
(74) *Attorney, Agent, or Firm* — Rosenberg, Klein & Lee (57) ABSTRACT

A double-screen rotary shaft structure includes two synchronous spiral channels disposed on the link shafts. Asynchronous assembly is slidably pivotally fitted on the two link shafts. Two bosses are disposed on the synchronous assembly and respectively inlaid in the spiral channels of the link shafts. Two connection members are respectively securely connected with the two link shafts. Two link assemblies are respectively pivotally fitted on the link shafts to synchronously move with the synchronous assembly. Two slide members are attached to lower sides of the connection members and formed with oblique slots. A guide slide connection member is disposed in each oblique slot and connected with the link assembly. The middle sections of two links are pivotally disposed on the connection members. Each link has a driving end pivotally connected with the link assembly and a driven end to drive the slide member.

20 Claims, 9 Drawing Sheets

(56) References Cited

U.S. PATENT DOCUMENTS

| | | | |
|---|---|---|---|
| 11,009,061 B2* | 5/2021 | Chang | E05D 11/06 |
| 11,009,919 B2* | 5/2021 | Hsu | F16C 11/04 |
| 11,091,944 B2* | 8/2021 | Siddiqui | G06F 1/1616 |
| 2020/0117233 A1* | 4/2020 | Ou | G06F 1/1652 |
| 2020/0359514 A1* | 11/2020 | Lin | E05D 3/12 |
| 2021/0014989 A1* | 1/2021 | Hsu | H05K 5/0226 |
| 2021/0381289 A1* | 12/2021 | Hsu | G06F 1/1681 |

* cited by examiner

DOUBLE-SCREEN ROTARY SHAFT STRUCTURE

BACKGROUND OF THE INVENTION

1. Field of the Invention

The present invention relates generally to a double-screen rotary shaft structure, and more particularly to a rotary shaft structure, which can achieve the effect that when two movable assemblies are stretched open and closed, the two movable assemblies always keep having minimum gap.

2. Description of the Related Art

The conventional pivot shaft structure applied to an electronic device for pivotally connecting two movable components (generally the display screen and the main body or two partial display screens connected with each other) is generally designed with double shafts, which synchronously operate to locate the two movable components (the display screen and the main body or two partial display screens) indifferent open angles for a user to conveniently use. For example, Taiwanese Utility Model Patent Publication No. M478992 discloses a double-shaft synchronous operation double-enclosure pivot shaft device structure. The pivot shaft device mainly includes a first shaft and a second shaft. A fixing plate is assembled and connected with one end of each of the first and second shafts. The fixing plates are respectively securely assembled with the upper cover display end and mainframe system end of the electronic device. Opposite spiral channels are respectively disposed on the bodies of the first and second shafts. The other end is an assembling end. A first locating spacer board and a second locating spacer board are fitted on the first and second shafts and oppositely spaced from each other by a set distance. The first and second shafts movably pass through the first and second locating spacer boards. The assembling ends of the first and second shafts pass through the second locating spacer board to directly assemble with a link washer. In cooperation with a threaded member, the washer is locked with the assembling end. A double-enclosure sleeve is disposed between the first and second locating spacer boards to pass through the first and second shafts. The double-enclosure sleeve has the form of an elongated tube with a cross section defining an internal space. An upper shaft enclosure section and a lower shaft enclosure section are disposed on at least one side of the double-enclosure sleeve. The upper and lower shaft enclosure sections are assembled with the first and second shaft by interference fit. A support shaft is disposed inside the double-enclosure sleeve. A slide block is fitted with the support shaft. The upper and lower ends of the slide block are respectively drivingly connected with the opposite spiral channels on the bodies of the first and second shafts. When the first and second shafts are rotated, the slide block is axially moved. Therefore, when the double shafts rotate, the double-enclosure sleeve can produce the necessary torque to form a double-shaft link mechanism in the sleeve.

However, in the above structural design, during the pivotal rotation, the distance between the two movable components (the upper cover di splay end and the mainframe system end) keeps constant. Therefore, in the case that the two movable components (the upper cover display end and the mainframe system end) respectively have larger thickness, it is necessary to reserve a wider distance between the first and second shafts. Otherwise, when the two movable components (the upper cover display end and the mainframe system end) are closed, the two movable components will interfere with each other to fail to close to each other. Under such circumstance, there is a larger gap between the first and second shafts to increase the stretched area and occupied room of the two movable components (the upper cover display end and the mainframe system end). This is unbeneficial to the miniaturization and lightweight design of the product.

It is therefore tried by the applicant to provide a double-screen rotary shaft structure to improve the shortcoming of the conventional pivot shaft structure.

SUMMARY OF THE INVENTION

It is therefore a primary object of the present invention to provide a double-screen rotary shaft structure includes a base seat and two link shafts respectively disposed on two sides of the base seat. Two synchronous spiral channels are disposed on the surfaces of the two link shafts. At least one restriction member is disposed on the base seat. The restriction member has two protruding pillars extending in parallel to each other. Two connection members are respectively securely connected with the two link shafts. A transverse slot is disposed on each of the two connection members and normal to the two link shafts. A synchronous assembly is disposed between the two link shafts. Two bosses are disposed on the synchronous assembly and respectively inlaid in the spiral channels. Two link assemblies are respectively pivotally fitted on the link shafts and connected with the synchronous assembly. Two slide members are respectively attached to the connection members. A synchronously extending oblique guide channel is disposed on one side of each slide member and directed to the two link shafts. The protruding pillars are fitted in the oblique guide channels. In addition, the slide members are formed with oblique slots. A guide slide connection member is disposed in each oblique slot and connected with the link members. The middle sections of two links are respectively pivotally disposed on the connection members. Each link has a driving end pivotally connected with the link assembly and a driven end extending into the transverse slot of the connection member. When the two connection members are closed to each other, the link shafts are driven to pivotally rotate. The synchronous assemblies drive the link assemblies to drive the links to pivotally rotate, whereby the two slide members are driven to respectively move in a direction away from the two link shafts. Also, the oblique guide channels slide in a direction to the link shafts relative to the protruding pillars so that when the two slide members (the connection members) are stretched open and closed, the two slide members (the connection members) can always keep having minimum gap.

It is a further object of the present invention to provide the above double-screen rotary shaft structure, in which a restriction torque member is disposed between the two link shafts. The two link shafts are held and fitted in two sides of the restriction torque member, whereby a torque (resistance) is applied to the two link shafts against rotation. Therefore, when the two slide members (the connection members) are stretched open and closed, the two slide members (the connection members) can always keep having sufficient support force at any angle and in any position so as to facilitate use.

To achieve the above and other objects, the double-screen rotary shaft structure of the present invention includes: a base seat; two link shafts assembled and disposed on two opposite sides of the base seat, at least one synchronously extending spiral channel being disposed on a surface of each of the two link shafts; a synchronous assembly slidably pivotally fitted on the two link shafts, at least two bosses being disposed on the synchronous assembly, the two bosses being respectively inlaid in the spiral channels of the two link shafts; two connection members respectively securely connected with the two link shafts, a transverse slot being disposed on each of the two connection members and normal to the two link shafts; two link assemblies slidably pivotally fitted on the two link shafts, the link assemblies being connected with the synchronous assembly to synchronously move therewith; two slide members respectively connected with two sections of an electronic device and attached to a surface of each connection member distal from the link assembly, the slide members being able to reciprocally slide in an extending direction of the transverse slot relative to the connection member, at least one oblique slot being disposed on each slide member, a guide slide connection member being disposed in the oblique slot and connected with the link assembly; and two links, each link having a driving end and a driven end disposed at two end sections and a middle section disposed between the driving end and the driven end, the middle section being pivotally disposed on the connection member, the driving end being pivotally connected with the link assembly, the driven end extending into the transverse slot of the connection member.

In the above double-screen rotary shaft structure, a protruding drive section is disposed on each of two sides of the synchronous assembly. The two drive sections are pivotally fitted on the two link shafts. Each link assembly is composed of a link member and a stop member. The link member partially extends to one side of the drive section. The stop member is disposed on the other side of the drive section.

In the above double-screen rotary shaft structure, a longitudinal guide slide slot is disposed on the connection member in parallel to the extending direction of the link shaft. At least one guide slide column is disposed on each of the link member and the stop member to extend into the longitudinal guide slide slot.

In the above double-screen rotary shaft structure, the link member partially extends under the stop member. The link member is formed with a hollow section. The guide slide column of the stop member extends through the hollow section into the longitudinal guide slide slot.

In the above double-screen rotary shaft structure, a connected section is disposed on each of the two link shafts. The connected section has a noncircular cross-sectional shape. A connection section is disposed on each of the two connection members. The connection section has a cross-sectional shape identical to that of the connected section. The connected section is tightly held and fitted in the connection section.

In the above double-screen rotary shaft structure, the connected section has a plane cut face partially formed on a surface of at least one side of the link shaft. The connection section is an elongated shaft hole with a cross-sectional shape identical to that of the connected section.

In the above double-screen rotary shaft structure, the two slide members are respectively connected with two sections of an electronic device. A synchronously extending oblique guide channel is transversely disposed on one side of each slide member and directed to the two link shafts. At least one restriction member is disposed on the base seat between the two link shafts. Two protruding pillars are disposed on two sides of the restriction member. The protruding pillars extend in parallel to each other. The protruding pillars respectively extend into the two oblique guide channels.

In the above double-screen rotary shaft structure, a restriction torque member is disposed between the two link shafts. The two link shafts are held and fitted in two sides of the restriction torque member, whereby the two link shafts are kept spaced from each other by a fixed distance and a rotational torque is applied to the two link shafts.

In the above double-screen rotary shaft structure, a protruding guide slide section is disposed on each of two sides of the connection member in parallel to the transverse slot. Two corresponding sides of the slide member are respectively formed with two guide channels fitted with the protruding guide slide sections.

In the above double-screen rotary shaft structure, at least one longitudinal slot is disposed on the connection member in parallel to the extending direction of the link shaft. The guide slide connection member passes through the longitudinal slot.

In the above double-screen rotary shaft structure, the link is formed with a bending structure near the middle section.

The present invention can be best understood through the following description and accompanying drawings, wherein:

DETAILED DESCRIPTION OF THE PREFERRED EMBODIMENTS

Figure 1:
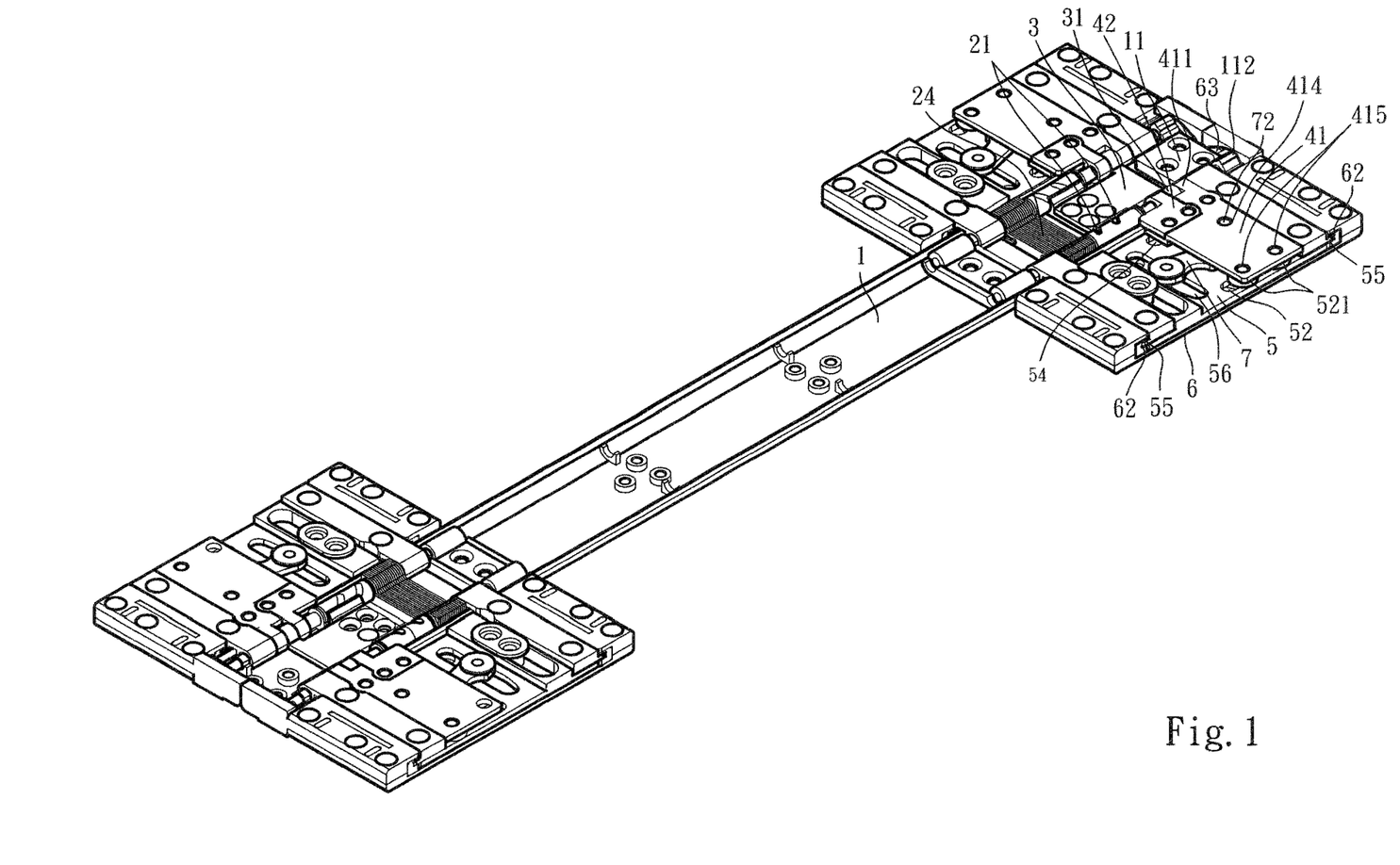
FIG. 1 is a perspective assembled view of the present invention.
Figure 2:
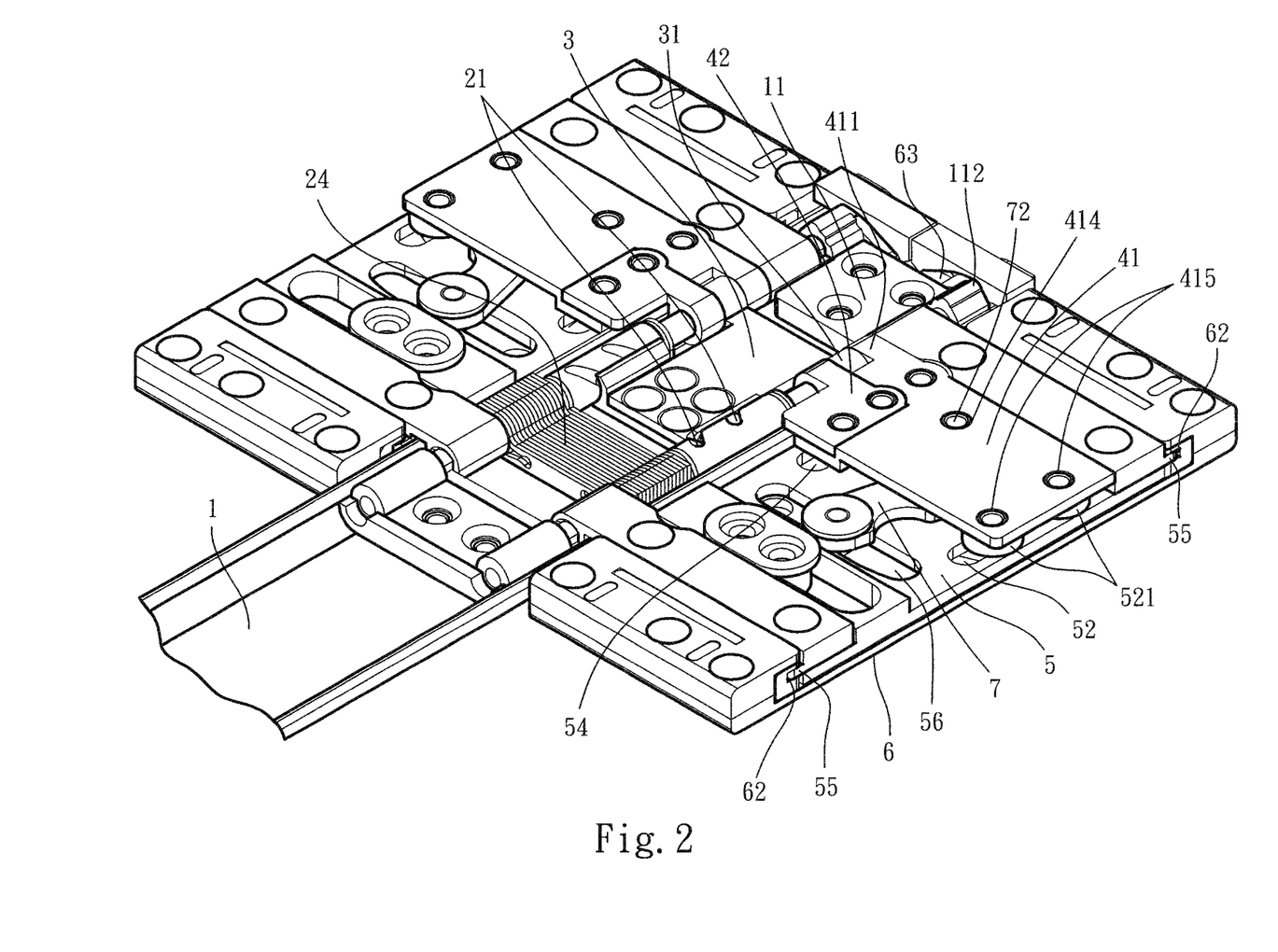
FIG. 2 is an enlarged perspective assembled view of one end of the present invention.
Figure 3:
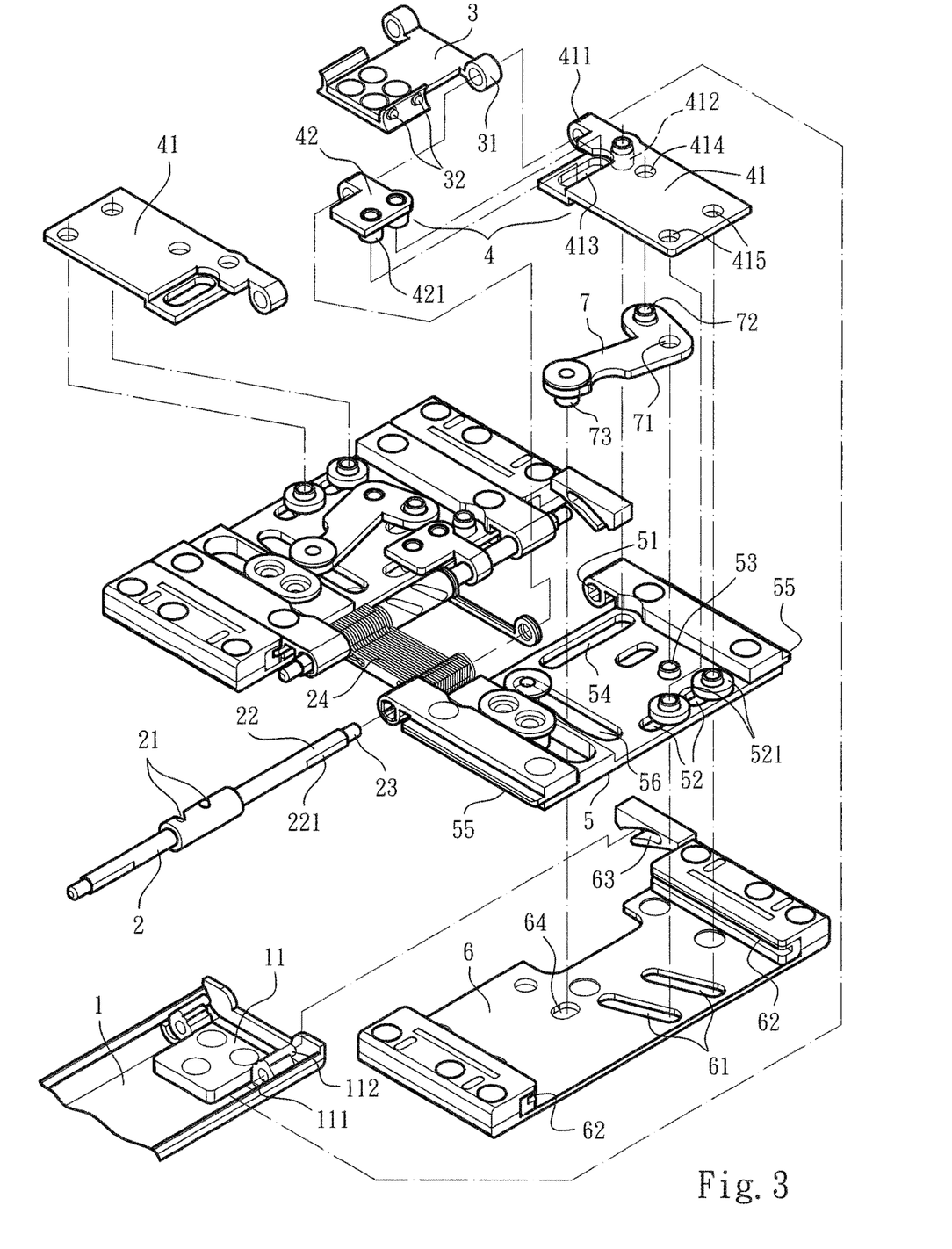
FIG. 3 is a perspective exploded view of one end of the present invention.

Please refer to FIGS. 1 to 3. The double-screen rotary shaft structure of the present invention includes a base seat 1, a link shaft 2, a synchronous assembly 3, a link assembly 4, a connection member 5, a slide member 6 and a link 7. The base seat 1 is an elongated plate structure body. A restriction member 11 is disposed at each of two end sections of the base seat 1. A shaft hole 111 and a protruding pillar 112 are respectively disposed on each of two sides of the restriction member 11.

A restriction torque member 24 is disposed on the base seat 1. Two link shafts 2 are held and fitted in two sides of the restriction torque member 24, whereby the two link shafts 2 are kept spaced from each other by a fixed distance and a torque (resistance) is applied to the two link shafts 2 against rotation. At least one end of each link shaft 2 is formed with a shaft end section 23, which can sequentially extend into the shaft hole 111, whereby the two link shafts 2 are assembled on two sides of the base seat 1. At least one synchronously extending spiral channel 21 and a connected section 22 are respectively disposed on the surface of each of the two link shafts 2. In this embodiment, the connected section 22 is a structure having a plane cut face 221 partially formed on the surface of at least one side of the link shaft 2.

A drive section 31 and at least one boss 32 are disposed on each of two sides of the synchronous assembly 3. The two drive sections 31 are respectively slidably pivotally fitted on the two link shafts 2. The two bosses 32 are respectively inlaid in the two spiral channels 21.

The two link assemblies 4 are respectively slidably pivotally fitted on the two link shafts 2. Each link assembly 4 is composed of a link member 41 and a stop member 42. A pivoted section 411 is disposed on one side of the link member 41 and pivotally fitted on the link shaft 2. The pivoted section 411 is disposed on the link shaft 2 on one side of the drive section 31. The stop section 42 is disposed on the other side of the drive section 31.

The two connection members 5 are respectively disposed on one side of the two link shafts 2. Each side of each connection member 5 is formed with a connection section 51 securely fitted with the connected section 22. (The connection section 51 has an elongated shaft hole with a cross-sectional shape identical to that of the connected section 22). Accordingly, the connection member 5 can drive the link shaft 2 to synchronously rotate. A longitudinal guide slide slot 54 and at least one longitudinal slot 52 are disposed on the connection member 5 in parallel to the extending direction of the link shaft 2. A transverse slot 56 is disposed on the connection member 5 between the longitudinal guide slide slot 54 and the longitudinal slot 52 (and normal to the extending direction of the link shaft 2). A protruding guide slide section 55 is disposed on at least one side of the connection member 5 in parallel to the transverse slot 56.

In a preferred embodiment, the link member 41 partially extends under the stop member 42. The link member 41 is formed with a hollow section 413. The link member 41 has a guide slide column 412 extending into the longitudinal guide slide slot 54. At least one guide slide column 421 is disposed on the stop member 42 to extend through the hollow section 413 into the longitudinal guide slide slot 54. The link member 41 and the stop member 42 are respectively disposed in the moving path of the synchronous assembly 3, whereby the link assembly 4 and the synchronous assembly 3 are connected with each other and synchronously slidable.

Two slide members 6 are respectively attached to a surface of each connection member 5 distal from the link assembly 4. At least one oblique slot 61 is respectively disposed on the slide member 6 in a position corresponding to each longitudinal slot 52. At least one guide slide connection member 521 passes through the longitudinal slot 52 to extend into the oblique slot 61. Two sides of the slide member 6 are respectively formed with two guide channels 62 fitted with the protruding guide slide sections 55, whereby the slide member 6 can reciprocally slide in the extending direction of the transverse slot 56 relative to the connection member 5.

In addition, a synchronously extending oblique guide channel 63 is transversely disposed on one side of each slide member 6 and directed to the link shafts 2. The two oblique guide channels 63 are respectively fitted with the two protruding pillars 112 of the restriction members 11.

Each of the two links 7 has a driving end 72 and a driven end 73 at two end sections and a middle section 71 disposed therebetween. The middle section 71 is pivotally disposed on the connection member 5 via pivot member 53. The driving end 72 is pivotally connected with a drive section 414 preset on the link member 41. The driven end 73 passes through the transverse slot 56 of the connection member 5 to pivotally connect with a connection section 64 preset on the slide member 6.

In a preferred embodiment, the link 7 can be formed with a bending structure near the middle section 71.

Figure 4:
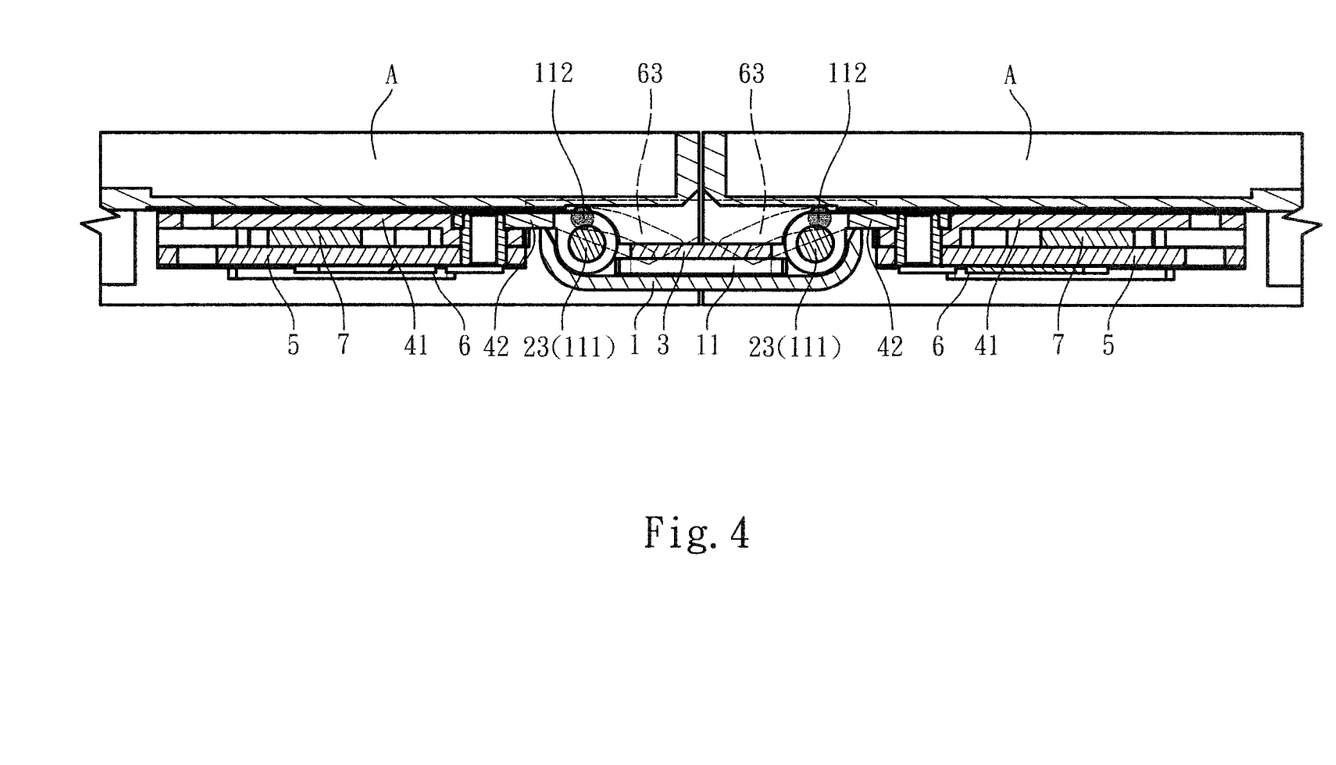
FIG. 4 is a side plane view of the present invention in a fully stretched open state.
Figure 5:
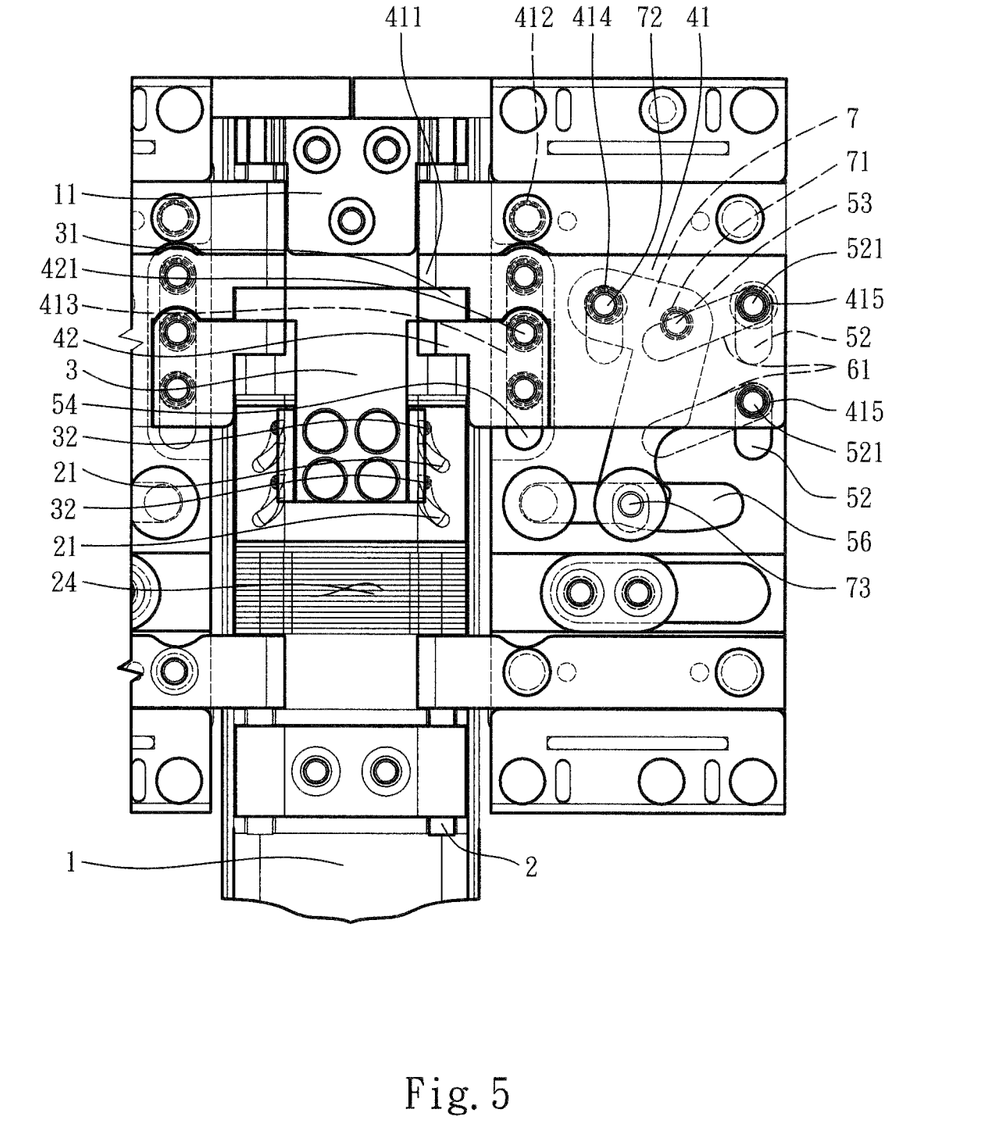
FIG. 5 is a plane view of the present invention in a fully stretched open state, showing the operation of the links and the relevant components.

Please refer to FIGS. 4 to 9. In practical application of the present invention, the two slide members 6 can be respectively connected with two sections (such as the screens A) of an electronic device. When the two connection members 5 are fully stretched open, an edge of one side of the two slide members 6 (near the base seat 1) are closed to each other to have a minimum gap. In addition, the protruding pillars 112 of the restriction members 11 are respectively positioned at one end of the two oblique guide channels 63 distal from each other (as shown in FIG. 4). Moreover, the driven end 73 of the link 7 is positioned on one side of the transverse slot 56 closer to the link shaft 2 (as shown in FIG. 5). At this time, the edges of the two sections (the screens A) of the electronic device are closed to each other for use.

Figure 6:
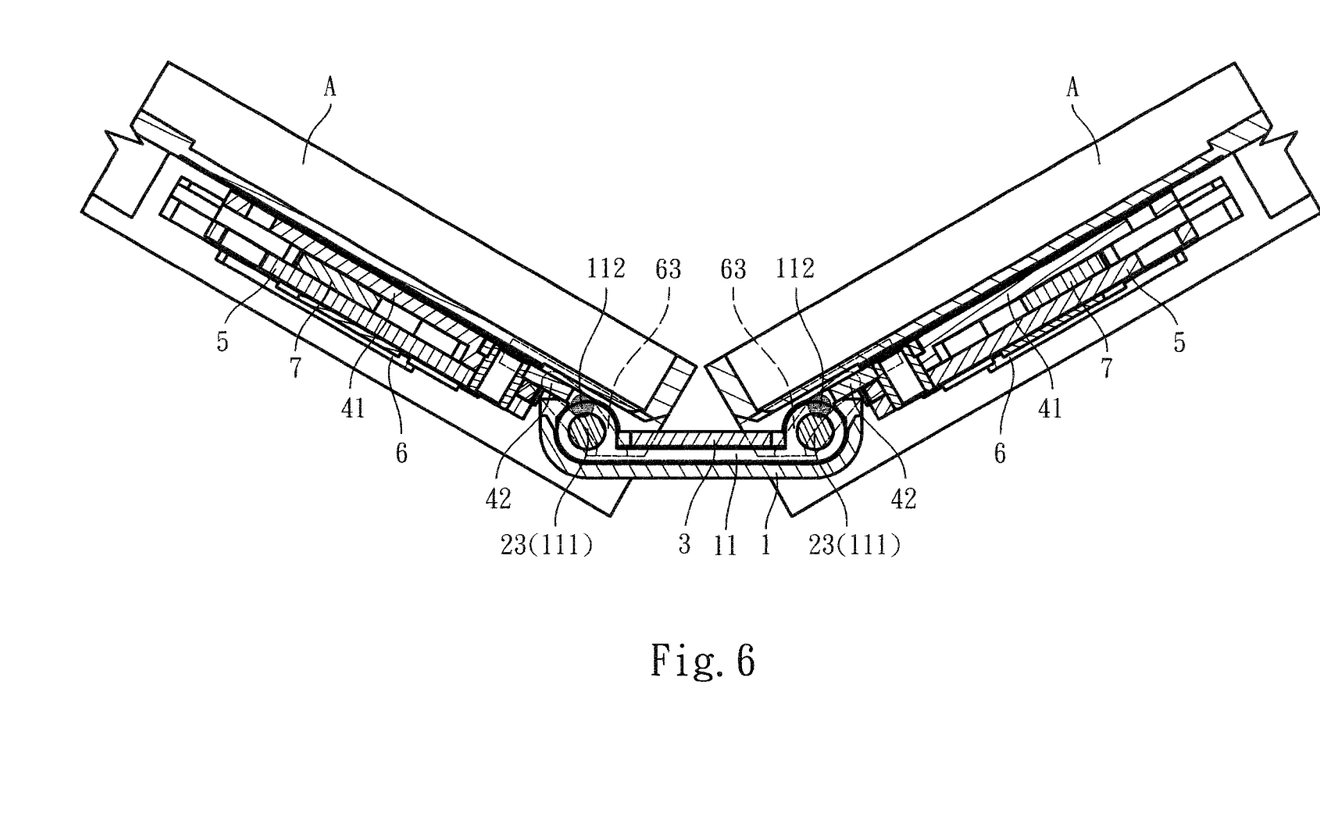
FIG. 6 is a side plane view of the present invention, showing that the present invention is closed.
Figure 7:
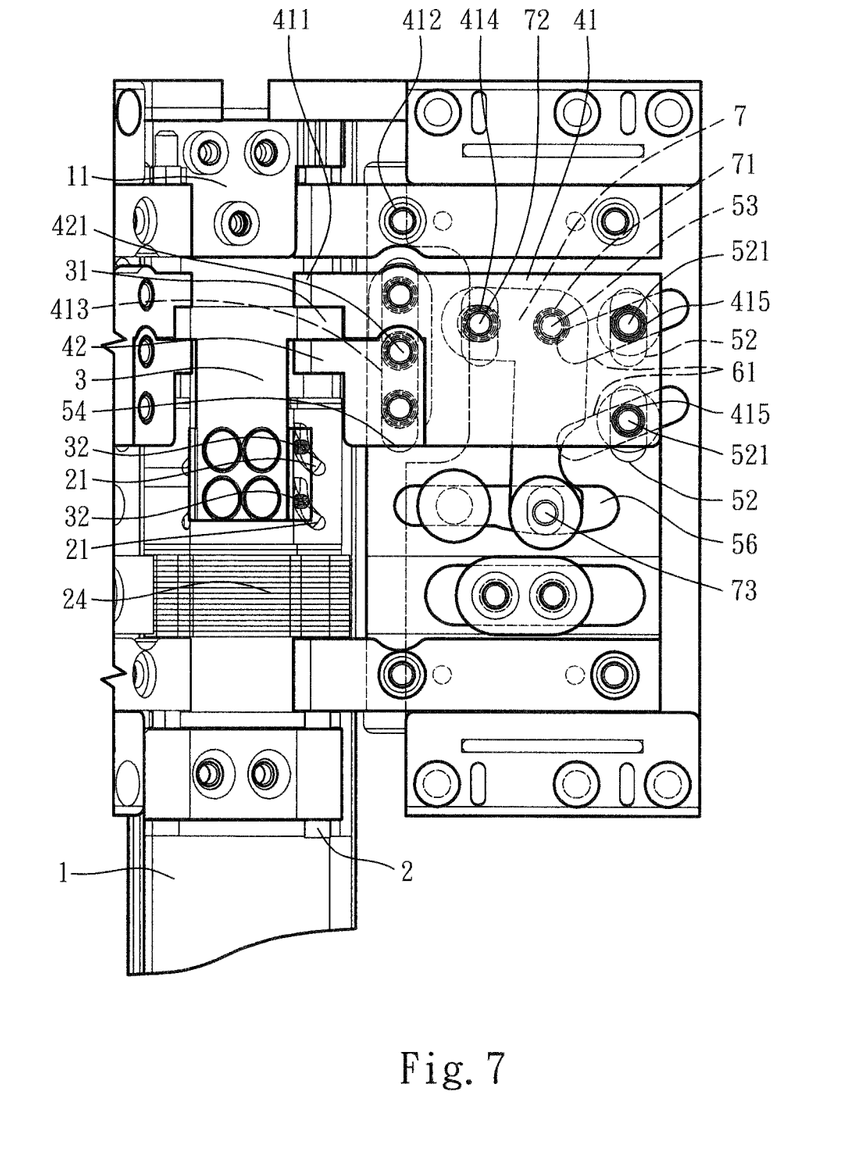
FIG. 7 is a plane view of the present invention in a closed state, showing the operation of the links and the relevant components.

When closing the two sections (the screens A) of the electronic device, the two connection members 5 are respectively pivotally rotated around the link shafts 2 to be closed to each other. During this procedure, the protruding pillars 112 of the restriction members 11 respectively slide toward the middle sections of the two oblique guide channels 63 (as shown in FIG. 6). Accordingly, the edges of the two slide members 6 (near the base seat 1) are gradually laterally separated. Also, via the connection sections 51 and the connected sections 22, the two connection members 5 respectively drive the two link shafts 2 to rotate. By means of the bosses 32, the link shafts 2 slide within the spiral channels 21. Accordingly, the synchronous assembly 3 can move in the axial direction of the link shafts 2. In addition, via the drive sections 31, the synchronous assemblies 3 drive the link assemblies 4 to slide along the longitudinal guide slide slot 54 (in parallel to the axial direction of the link shafts 2 as shown in FIG. 7). The link members 41 drive the driving ends 72 of the links 7, whereby the links 7 are pivotally rotated so that the driven ends 73 can drive the slide members 6 to move along the transverse slots 56 in a direction away from the link shafts 2. At the same time, the link members 41 also drive the guide slide connection member 521 to slide along the longitudinal slots 52 and the oblique slots 61. The connection sections 51 of two sides of the connection members 5 and the guide channels 62 of the slide members 6 guide each other so that the slide members 6 can keep stably moving.

Figure 8:
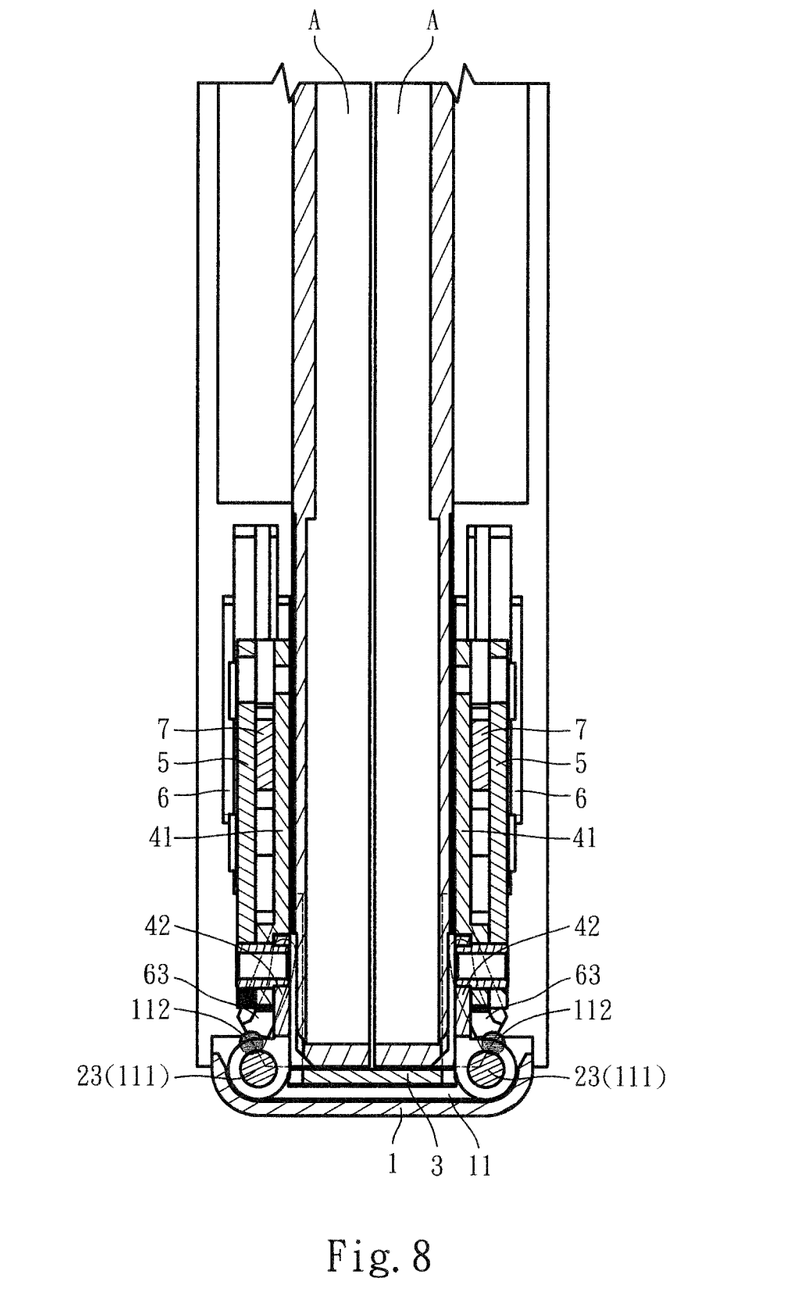
FIG. 8 is a side plane view of the present invention, showing that the present invention is fully closed.
Figure 9:
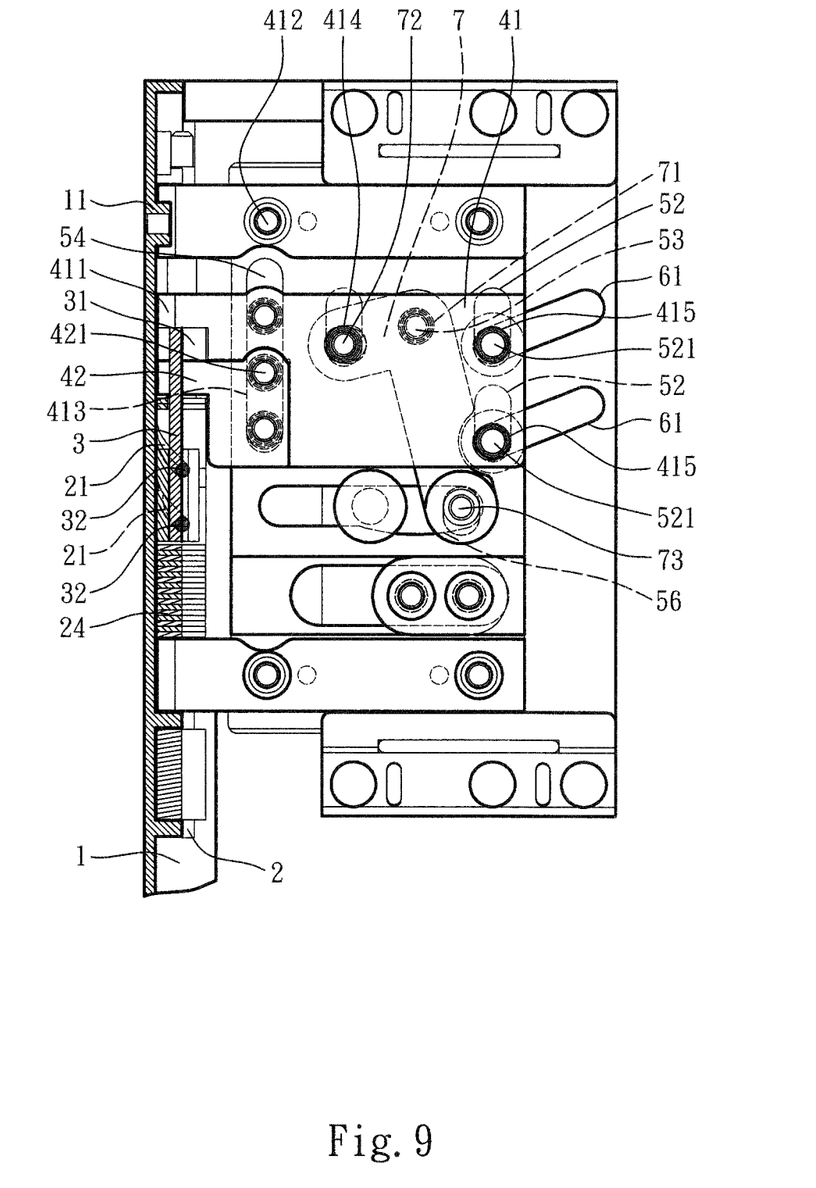
FIG. 9 is a plane view of the present invention in a fully closed state, showing the operation of the links and the relevant components.

When the two connection members 5 are fully closed, the protruding pillars 112 of the restriction members 11 are respectively positioned at one end of the two oblique guide channels 63 proximal to each other (as shown in FIG. 8). At this time, the top faces of the two slide members 6 (connection members 5) are closed to each other so that the two sections (the screens A) of the electronic device can be closed to each other, whereby the electronic device has minimum closed volume. Also, via the drive sections 31, the synchronous assemblies 3 drive the link assemblies 4 to drive the driving ends 72 of the links 7, whereby the driven ends 73 drive the slide members 6 to slide to one end of the transverse slots 56 distal from the link shafts 2 (as shown in FIG. 9). Therefore, during the closing procedure, the rotational axis of the two slide members 6 (connection members 5) can be gradually laterally changed so that during the closing procedure, the edges of the two sections (the screens A) of the electronic device can be effectively prevented from interfering with each other or touching each other.

In conclusion, the double-screen rotary shaft structure of the present invention can truly achieve the effect that when stretched open and closed, the two movable assemblies can always keep having minimum gap. The double-screen rotary shaft structure of the present invention is inventive and advanced.

The above embodiments are only used to illustrate the present invention, not intended to limit the scope thereof. Many modifications of the above embodiments can be made without departing from the spirit of the present invention.

What is claimed is:

1. A double-screen rotary shaft structure comprising:
   a base seat;
   two link shafts assembled and disposed on two opposite sides of the base seat, at least one synchronously extending spiral channel being disposed on a surface of each of the two link shafts;
   a synchronous assembly slidably pivotally fitted on the two link shafts, at least two bosses being disposed on the synchronous assembly, the two bosses being respectively inlaid in the spiral channels of the two link shafts;
   two connection members respectively securely connected with the two link shafts, a transverse slot being disposed on each of the two connection members and normal to the two link shafts;
   two link assemblies slidably pivotally fitted on the two link shafts, the link assemblies being connected with the synchronous assembly to synchronously move therewith;
   two slide members respectively attached to a surface of each connection member distal from the link assembly, the slide members being able to reciprocally slide in an extending direction of the transverse slot relative to the connection member, at least one oblique slot being disposed on each slide member, a guide slide connection member being disposed in the oblique slot and connected with the link assembly; and
   two links, each link having a driving end and a driven end disposed at two end sections and a middle section disposed between the driving end and the driven end, the middle section being pivotally disposed on the connection member, the driving end being pivotally connected with the link assembly, the driven end extending into the transverse slot of the connection member.

2. The double-screen rotary shaft structure as claimed in claim 1, wherein a protruding drive section is disposed on each of two sides of the synchronous assembly, the two drive sections being pivotally fitted on the two link shafts, each link assembly being composed of a link member and a stop member, the link member partially extending to one side of the drive section, the stop member being disposed on the other side of the drive section.

3. The double-screen rotary shaft structure as claimed in claim 2, wherein a longitudinal guide slide slot is disposed on the connection member in parallel to the extending direction of the link shaft, at least one guide slide column being disposed on each of the link member and the stop member to extend into the longitudinal guide slide slot.

4. The double-screen rotary shaft structure as claimed in claim 3, wherein the link member partially extends under the stop member, the link member being formed with a hollow section, the guide slide column of the stop member extending through the hollow section into the longitudinal guide slide slot.

5. The double-screen rotary shaft structure as claimed in claim 2, wherein a connected section is disposed on each of the two link shafts, the connected section having a noncircular cross-sectional shape, a connection section being disposed on each of the two connection members, the connection section having a cross-sectional shape identical to that of the connected section, the connected section being tightly held and fitted in the connection section.

6. The double-screen rotary shaft structure as claimed in claim 5, wherein the connected section has a plane cut face partially formed on a surface of at least one side of the link shaft, the connection section being an elongated shaft hole with a cross-sectional shape identical to that of the connected section.

7. The double-screen rotary shaft structure as claimed in claim 1, wherein the two slide members are respectively connected with two sections of an electronic device, a synchronously extending oblique guide channel being transversely disposed on one side of each slide member and directed to the two link shafts, at least one restriction member being disposed on the base seat between the two link shafts, two protruding pillars being disposed on two sides of the restriction member, the protruding pillars extending in parallel to each other, the protruding pillars respectively extending into the two oblique guide channels.

8. The double-screen rotary shaft structure as claimed in claim 2, wherein the two slide members are respectively connected with two sections of an electronic device, a synchronously extending oblique guide channel being transversely disposed on one side of each slide member and directed to the two link shafts, at least one restriction member being disposed on the base seat between the two link shafts, two protruding pillars being disposed on two sides of the restriction member, the protruding pillars extending in parallel to each other, the protruding pillars respectively extending into the two oblique guide channels.

9. The double-screen rotary shaft structure as claimed in claim 5, wherein the two slide members are respectively connected with two sections of an electronic device, a synchronously extending oblique guide channel being transversely disposed on one side of each slide member and directed to the two link shafts, at least one restriction member being disposed on the base seat between the two link shafts, two protruding pillars being disposed on two sides of the restriction member, the protruding pillars extending in parallel to each other, the protruding pillars respectively extending into the two oblique guide channels.

10. The double-screen rotary shaft structure as claimed in claim 1, wherein a restriction torque member is disposed between the two link shafts, the two link shafts being held and fitted in two sides of the restriction torque member, whereby the two link shafts are kept spaced from each other by a fixed distance and a rotational torque is applied to the two link shafts.

11. The double-screen rotary shaft structure as claimed in claim 2, wherein a restriction torque member is disposed between the two link shafts, the two link shafts being held and fitted in two sides of the restriction torque member, whereby the two link shafts are kept spaced from each other by a fixed distance and a rotational torque is applied to the two link shafts.

12. The double-screen rotary shaft structure as claimed in claim 7, wherein a restriction torque member is disposed between the two link shafts, the two link shafts being held and fitted in two sides of the restriction torque member, whereby the two link shafts are kept spaced from each other by a fixed distance and a rotational torque is applied to the two link shafts.

13. The double-screen rotary shaft structure as claimed in claim 1, wherein a protruding guide slide section is disposed on each of two sides of the connection member in parallel to the transverse slot, two corresponding sides of the slide member being respectively formed with two guide channels fitted with the protruding guide slide sections.

14. The double-screen rotary shaft structure as claimed in claim 2, wherein a protruding guide slide section is disposed on each of two sides of the connection member in parallel to the transverse slot, two corresponding sides of the slide member being respectively formed with two guide channels fitted with the protruding guide slide sections.

15. The double-screen rotary shaft structure as claimed in claim 7, wherein a protruding guide slide section is disposed on each of two sides of the connection member in parallel to the transverse slot, two corresponding sides of the slide member being respectively formed with two guide channels fitted with the protruding guide slide sections.

16. The double-screen rotary shaft structure as claimed in claim 10, wherein a protruding guide slide section is disposed on each of two sides of the connection member in parallel to the transverse slot, two corresponding sides of the slide member being respectively formed with two guide channels fitted with the protruding guide slide sections.

17. The double-screen rotary shaft structure as claimed in claim 1, wherein at least one longitudinal slot is disposed on the connection member in parallel to the extending direction of the link shaft, the guide slide connection member passing through the longitudinal slot.

18. The double-screen rotary shaft structure as claimed in claim 7, wherein at least one longitudinal slot is disposed on the connection member in parallel to the extending direction of the link shaft, the guide slide connection member passing through the longitudinal slot.

19. The double-screen rotary shaft structure as claimed in claim 10, wherein at least one longitudinal slot is disposed on the connection member in parallel to the extending direction of the link shaft, the guide slide connection member passing through the longitudinal slot.

20. The double-screen rotary shaft structure as claimed in claim 13, wherein at least one longitudinal slot is disposed on the connection member in parallel to the extending direction of the link shaft, the guide slide connection member passing through the longitudinal slot.

\* \* \* \* \*